United States Patent [19]

Tremblay

[11] Patent Number: 4,700,898

[45] Date of Patent: Oct. 20, 1987

[54] CONCENTRATION OF SILICON CARBIDE

[76] Inventor: Rémi Tremblay, 350 avenue des Peupliers, Quebec, Canada, G1P 3W8

[21] Appl. No.: 861,066

[22] Filed: May 8, 1986

[51] Int. Cl.$^4$ .................... B02L 23/12; B02L 21/00
[52] U.S. Cl. .................... 241/14; 241/16; 241/17; 241/23; 241/24
[58] Field of Search .................... 241/14, 16, 17, 23, 241/24

[56] References Cited

FOREIGN PATENT DOCUMENTS 3008991 10/1981 Fed. Rep. of Germany ........ 241/24
224180 6/1985 Fed. Rep. of Germany ........ 241/24

Primary Examiner—Timothy V. Eley
Attorney, Agent, or Firm—Oblon, Fisher, Spivak, McClelland, & Maier

[57] ABSTRACT

According to the invention, after having previously crushed and ground a starting material containing silicon carbide, the latter is treated by separation in a dense medium, such as one comprising ferrosilicon or a suspension of magnetite in water. There is obtained a concentrate of silicon carbide without having to use the step of manual sorting.

20 Claims, 1 Drawing Figure

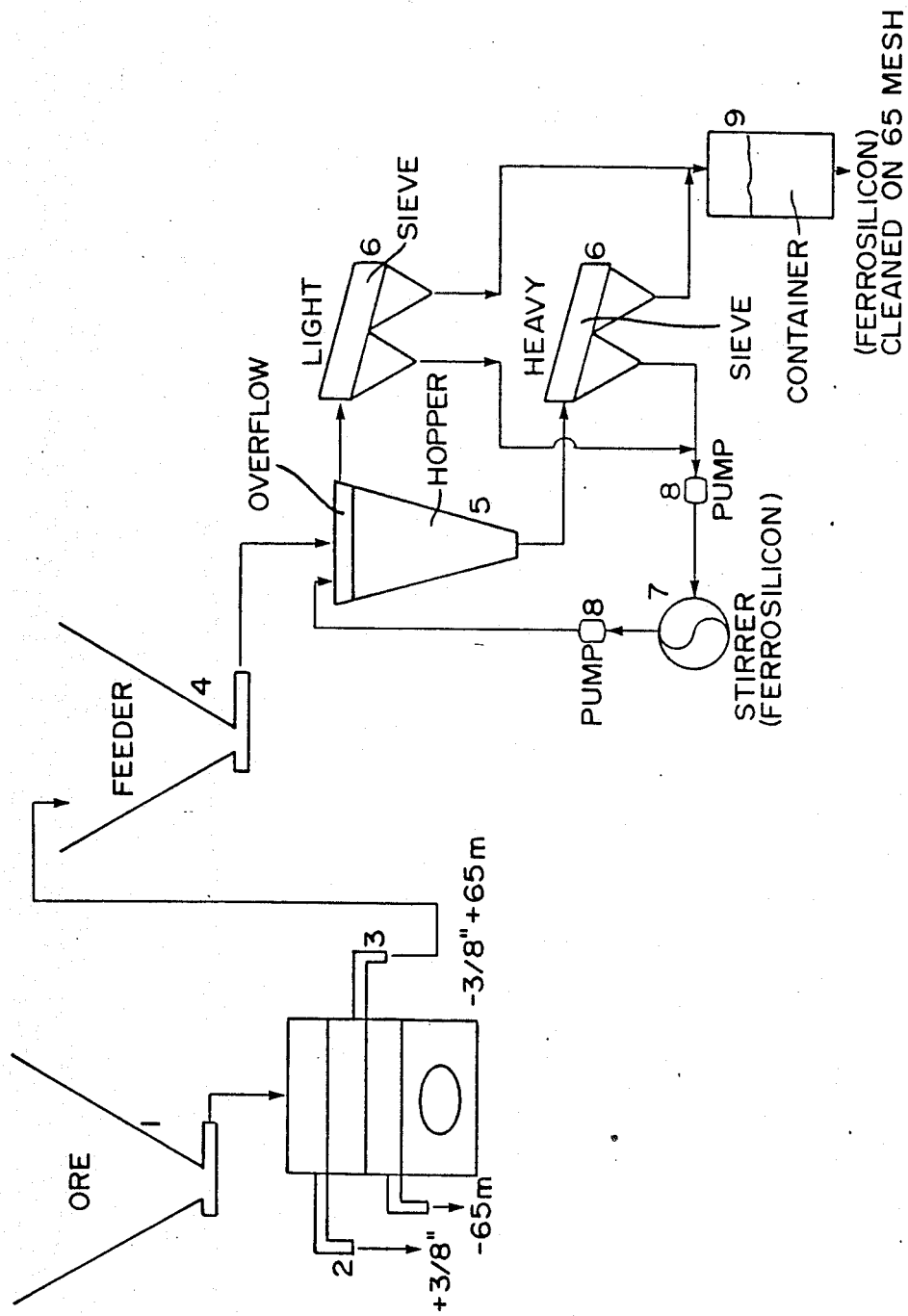

CONCENTRATION OF SILICON CARBIDE

BACKGROUND OF THE INVENTION (a) Field of the Invention

The invention relates to a process for concentrating silicon carbide. More particularly, the invention relates to a process of purifying silicon carbide, by separation of silicon carbide while removing its main impurities, carbon and silicon. This separation is carried out by gravimetry in a dense medium.

(b) Description of Prior Art

Silicon carbide is normally produced by means of pyrometallurgical methods in electrical ovens. The latter usually measure about 12 feet wide by 35 feet long. An oven consist of a wall of about 4 feet high of refractory brick. This wall connects two perpendicular walls which form the two ends of the oven. These two ends are the electrodes. The load of recycled material, such as silica, for example, from Saint-Canut (Indusmin), and of coke is prepared by automatic weighing and mixing to thereafter be sent to the furnace by means of conveyors. When the furnace is half full, loading is stopped. A depression is made in the load from one electrode to the other. The depression is thereafter filled with petroleum coke which will serve as nucleus of resistance. The load is then continued until the furnace is filled (about 10 feet). Each load contains about seventy tons of material, which gives from 6 to 12 tons of acceptable carbide. Electrical power of 2,000 kw is thereafter applied. The reaction proceeds in two stages:

$$SiO + 2C \rightarrow Si + 2CO \text{ and} \tag{1}$$

$$Si + C \rightarrow SiC \tag{2}$$

Heating lasts for about 1.5 days. Cooling lasts about 2 days. At this stage, the load is formed of an unconverted material (firesand), containing a compact cylinder of about three feet diameter connecting the two electrodes. The cylinder, when viewed radially from the surface to the center, comprises a two inch outer layer containing 30 to 50% SiC, a six inch layer of small crystal of carbides containing 80 to 96% SiC, a six inch layer of large carbide crystals containing 97% SiC and an empty space of four inches. This empty space corresponds to the petroleum coke resistance which has been consumed.

Now, in order to obtain concentrates having a high content of silicon carbide, it is necessary first to separate the outer layer from the nucleus of silicon carbide of the interior layers. This grey layer is much less crystallized and contains only 30% to 50% of silicon carbide. Secondly, the portion which is of less purity must be separated from the second layer containing 80% SiC, in order to produce a final product containing 97% and less than 0.45% free carbon.

In order to obtain a concentrate of silicon carbide it is necessary to manually sort out the three layers and only the one or the ones which contain desired or acceptable concentrations are retained.

It is obvious that is would be of interest to be able to rely on an automatic process which would overcome manpower problems. Indeed, presently, the concentration of silicon carbide is carried out by manual sorting in all the manufactures which exist in the world.

To our knowledge, there is no patent nor any other reference relative to a process enabling to concentrate silicon carbide otherwise than by manual steps.

SUMMARY OF INVENTION

It is therefore an object of the present invention to facilitate the concentration of silicon carbide by a so called automatic process.

An object of the invention resides in the concentration of silicon carbide from ground starting material, by treating the latter by separation in a medium of high density.

More specifically, the invention consists of a process for the concentration of silicon carbide, characterized by the following steps:

(a) a starting material containing silicon carbide is crushed, under conditions enabling to release free carbon and free SiC;

(b) the crushed product is sieved to remove particles which are undesirable with respect to granulometry and the latter are recycled to ovens;

(c) the reject of the sieved product is introduced in a medium of high density, and by separation in the high density medium, there is obtained a heavy fraction and a light fraction;

(d) the heavy fraction with a high concentration of silicon carbide is recovered and the light fraction is recycled to the ovens used for the production of silicon carbide.

The starting material can be crushed by any known means, as is well known to anyone skilled in the art. However, crushing is preferably carried out by means of a jaw crusher, although this operation can also be carried out by autofriction or any known means.

Preferably, but not essentially, the starting material comprises a cylinder obtained by heating, in an electrical oven, a load comprising silica, recycled material and coke.

According to a preferred embodiment of the invention, the starting material is crushed to $\frac{3}{8}''$, $\frac{1}{2}''$ or $1''$ or to any other size considered useful by one skilled in the art.

Usually, the starting material used contains between 85% and 95% silicon carbide.

According to a preferred embodiment of the invention, the crushed product is screened to a value comprising between about $1''$ and $\frac{1}{4}''$, preferably about $\frac{3}{8}''$.

According to a preferred embodiment of the invention, the crushed product is screened so as to obtain a reject which contains between 88% and 96% silicon carbide.

Usually, the high density medium has a density which is between about 2.2 and about 3.0, for example, between about 2.3 and about 2.8. Preferably, the density of the high density medium is about 2.3.

The medium of high density can vary to a great extent, according to needs.

Preferably, the medium of high density comprises water and ferrosilicon, or water and magnetite, whose density is adjusted depending on the desired concentration of silicon carbide in the concentrated product.

Usually, the parameters are adjusted so that the heavy fraction contains about 97% silicon carbide and 0.20% free carbon.

At the end of the operation, it is recommended to bring separately the heavy fraction and the light fraction on vibrating drainage sieve from which the extracted high density medium, comprising a water suspension of ferrosilicon is recycled to the start of the circuit.

After drainage, it is also recommended to separately wash the heavy fraction and the light fraction with water on humid sieve to remove any remaining ferrosilicon, which is also recycled at the start of the circuit, after densifying with a densifier and/or magnetic separators and formation of another heavy medium pulp.

According to a specific embodiment of the invention, the concentration of silicon carbide from a cylinder of starting material containing silicon carbide obtained by heating a load comprising silica, recycled material containing silicon carbide and carbon coke, in an electrical oven, is carried out in the following manner. The cylinder of starting material containing silicon carbide is crushed by means of a jaw crusher to a granulometry between about ¼" and 1", the starting material containing between about 85% and about 95% silicon carbide. The crushed product is screened to a value between ¼" and 1" so as to give a screened product containing between about 88% and about 96% of silicon carbide, the undesirable particles are removed and they are recirculated to the ovens. The sized screened product is thereafter introduced in a high density medium comprising water and ferrosilicon, whose density is adjusted as a function of the desired concentration of silicon carbide in the concentrated product and, by separation in a high density medium based on water and ferrosilicon, there is obtained a heavy fraction showing about 97% silicon carbide and 0.20% free carbon and a light fraction containing about 92% silicon carbide and 0.50% free carbon. The heavy fraction and the light fraction are separately brought to vibrating drainage sieve from which the high density medium which is extracted and comprising a water suspension of ferrosilicon is recycled at the start of the circuit. After drainage, the heavy fraction and the light fraction are washed separately with water on humid sieve to remove the remaining ferrosilicon, which, after densifying with a densifier and/or magnetic separators and formation of another pulp, is recycled at the start of the circuit and the light fraction is recycled to the ovens used for the production of silicon carbide.

BRIEF DESCRIPTION OF DRAWINGS

The invention will now be described with reference to the annexed drawing which is given only by way of illustration and without any intention to limit the invention thereto. In the drawings, The single FIGURE is a flow sheet illustrating a treatment of silicon carbide according to the invention.

With reference to the drawing of the single FIGURE, it will be seen that, in a first step, the ore, such as a cylinder of silicon carbide produced directly from the ovens, previously reduced to coarse particles is sent to a funnel 1. Then, the crushed product is directed towards a screening assembly. The screening assembly comprises two vibrating screens of the type SWECO (trade mark) 2 and 3. The undersize from screen 2 with 9.5 mm openings is fed to screen 3 of 0.212 openings. The +65 mesh fraction is sent to feeder 4 from which the purification will be carried out.

The screened product passes from the feeder 4 to a hopper for separating in high density medium. The high density medium comprises water and ferrosilicon, whose specifications are given Table I, in a specific proportion to give the desired density. On the other hand, a high density medium containing ferrosilicon is added to the screened product by means of a stirrer 7 and a pump 8. The rate of feeding is of the order of 225 kg/h and the surface of the separating hopper is 1316 cm$^2$. The separation of the components in the high density medium takes place immediately.

The heavy fraction and the light fraction are separately led to vibrating drainage screen 6 to recycle the ferrosilicon which is then recycled by means of pump 8. Thereafter, water jets are used to wash the heavy fraction and the light fraction and remove the remaining ferrosilicon which is recovered in container 9 and is recycled at the start of the circuit, after densifying with a densifier and/or magnetic separators and formation of another pulp.

TABLE I

| Characteristics of ferrosilicon |
|---|

Density: 6.6 g/ml
Chemical composition of ferrosilicon
(according to company selling it)

| Element | % |
|---|---|
| Fe | 77 |
| Si | 16 |
| $TiO_2$ | 4 |
| $Al_2O_3$ | 2 |

| Granulometry of ferrosilicon | | |
|---|---|---|
| Mesh | % Weight | % Cumulative |
| +200 | 2.8 | 2.8 |
| −200 +270 | 9.7 | 12.5 |
| −270 +325 | 17.9 | 30.4 |
| −325 +400 | 12.2 | 42.6 |
| −400 | 57.4 | 100.0 |

The examples which follow are given only as illustration and without limiting this invention thereto.

EXAMPLE 1

In the laboratory, a high density medium Denver separator formed of cones, is used. The latter contains 35 mesh trellice baskets in the cones. The purpose of these baskets is to collect the heavy and light products while preventing that they be circulated by the pump which maintains the circulation of the high density medium at a certain flow. The sample test was −¼" +28 m.

Four tests were carried out, in which the first one, represented a search for the optimal density by varying the density of the high density medium, and the three other tests were with fixed densities at 2.46; 2.36 and 2.24 to determine the quality of the heavy product and the rate of recovery.

The results are given in Tables II and III.

EXAMPLE 2

In the pilot-plant, the method used is the one described in the drawing. The sample received showed 94.6% SiC. After screening, the fraction −9.5 mm mm analyses 95.3% SiC.

At densities of 2.60 and 2.66, the heavy fractions respectively analyse 96.1% and 95.7% SiC. After an additional washing, to remove the remaining ferrosilicon, the heavy fraction obtained at a density of 2.66 passes from 95.7 to 96.4% SiC.

Table IV gives the analysis obtained.

TABLE II

Metallurgical results of separation in heavy density medium
Silicon carbide −¼″ +28 m

| Heavy Product | Density | Weight g | Weight % | Total C Anal % | Total C Units | Total C Dist % | Free C Anal % | Free C Units | Free C Dist % | Si Anal % | Si Units | Si Dist % |
|---|---|---|---|---|---|---|---|---|---|---|---|---|
| | 2.71 | 4.5 | 1.13 | 29.52 | 0.33 | 1.12 | 0.30 | 0.01 | 0.47 | 97.21 | 1.10 | 1.13 |
| | 2.65 | 2.6 | 0.65 | 29.53 | 0.19 | 0.64 | 0.32 | 0.01 | 0.29 | 97.51 | 0.63 | 0.65 |
| | 2.60 | 18.3 | 4.59 | 29.17 | 1.34 | 4.49 | 0.17 | 0.01 | 1.08 | 96.81 | 4.43 | 4.57 |
| | 2.54 | 44.2 | 11.06 | 29.52 | 3.26 | 10.96 | 0.18 | 0.02 | 2.76 | 97.95 | 10.83 | 11.17 |
| | 2.46 | 109.6 | 27.43 | 29.61 | 8.12 | 27.27 | 0.22 | 0.06 | 8.36 | 98.11 | 26.91 | 27.74 |
| | 2.41 | 58.9 | 14.74 | 29.39 | 4.33 | 14.55 | 0.27 | 0.04 | 5.52 | 97.21 | 14.33 | 14.77 |
| | 2.36 | 33.1 | 8.88 | 29.59 | 2.45 | 8.23 | 0.43 | 0.04 | 4.94 | 97.34 | 8.06 | 8.31 |
| | 2.24 | 77.6 | 19.42 | 30.11 | 5.85 | 19.63 | 1.09 | 0.21 | 29.35 | 96.88 | 18.81 | 19.39 |
| Total Heavy | | 348.8 | 87.29 | 29.65 | 25.88 | 86.89 | 0.44 | 0.38 | 52.77 | 97.51 | 85.11 | 87.74 |
| Light | 2.24 | 50.8 | 12.71 | 30.71 | 3.90 | 13.11 | 2.68 | 0.34 | 47.23 | 93.57 | 11.89 | 12.26 |
| Total | | 399.6 | 100.00 | 29.78 | 29.78 | 100.00 | 0.72 | 0.72 | 100.00 | 97.00 | 97.00 | 100.00 |

TABLE III

Metallurgical separations in heavy density medium
Silicon carbide −¼″ +28 m

| Product | Weight g | Weight % | Total C Anal % | Total C Units | Total C Dist % | Free C Anal % | Free C Units | Free C Dist % | SiC Anal % | SiC Units | SiC Dist % |
|---|---|---|---|---|---|---|---|---|---|---|---|
| Density 2.46 | | | | | | | | | | | |
| Heavy | 164.2 | 40.74 | 29.35 | 11.96 | 40.35 | 0.17 | 0.07 | 9.45 | 97.41 | 39.68 | 41.13 |
| Light | 238.8 | 59.26 | 29.83 | 17.67 | 59.65 | 1.12 | 0.66 | 90.55 | 95.84 | 56.79 | 58.87 |
| Total | 403.0 | 100.00 | 29.63 | 29.63 | 100.00 | 0.73 | 0.73 | 100.00 | 96.48 | 96.47 | 100.00 |
| Density 2.36 | | | | | | | | | | | |
| Heavy | 299.4 | 74.53 | 29.44 | 21.94 | 74.02 | 0.25 | 0.19 | 25.56 | 97.44 | 72.62 | 75.24 |
| Light | 102.3 | 25.47 | 30.24 | 7.70 | 25.98 | 2.13 | 0.54 | 74.44 | 93.84 | 23.90 | 24.76 |
| Total | 401.7 | 100.00 | 29.64 | 29.64 | 100.00 | 0.73 | 0.73 | 100.00 | 96.52 | 96.52 | 100.00 |
| Density 2.24 | | | | | | | | | | | |
| Heavy | 351.4 | 87.81 | 29.55 | 25.95 | 87.36 | 0.36 | 0.32 | 49.18 | 97.44 | 85.56 | 88:24 |
| Light | 48.8 | 12.19 | 30.8 | 3.75 | 12.64 | 2.68 | 0.32 | 50.82 | 93.57 | 11.41 | 11.76 |
| Total | 400.2 | 100.00 | 29.70 | 29.70 | 100.00 | 0.64 | 0.64 | 100.00 | 96.97 | 96.97 | 100.00 |

TABLE IV

Analysis of products obtained
At densities of 2.60 and 2.66

| | Total Carbon % | Free Carbon % | SiC % |
|---|---|---|---|
| Density 2.60 | | | |
| Heavy | 29.1 | 0.28 | 96.1 |
| Light | 30.0 | 2.49 | 91.7 |
| Feed Analyzed (Average of 2 analysis) | 29.4 | 0.79 | 95.3 |
| Density 2.66 | | | |
| Heavy | 29.1 | 0.24 | 96.4 |
| Light | 29.3 | 1.62 | 92.4 |
| Feed Analyzed (Average of 2 analysis) | 29.4 | 0.79 | 95.3 |

I claim:

1. A process for concentrating silicon carbide which comprises the following steps:
   (a) crushing a starting material containing silicon carbide under conditions capable of releasing free carbon and of freeing silicon carbide;
   (b) screening the crushed product to separate a rejected fraction and to remove particles of undesirable granulometries and then passing said removed particles to ovens;
   (c) introducing said rejected fraction into a high density medium, and separating said rejected fraction in a high density medium into a heavy fraction and a light fraction;
   (d) recovering said heavy fraction having a high concentration of silicon carbide and recycling said light fraction to silicon carbide producing ovens.

2. Process according to claim 1, wherein the starting material is crushed with a jaw crusher.

3. Process according to claim 1, wherein the starting material comprises a cylinder obtained by heated a load comprising silica, recycled material and coke in an electrical oven.

4. Process according to claim 1, wherein the starting material is crushed to ½″.

5. Process according to claim 1, wherein the starting material is crushed to 1″.

6. Process according to claim 1, wherein the starting material is crushed to ⅜″.

7. Process according to claim 1, wherein the starting material is crushed to ¼″.

8. Process according to claim 1, wherein the starting material contains between about 85% and 95% SiC.

9. Process according to claim 1, wherein the crushed product is screened to a value between −1″ and 65 mesh.

10. Process according to claim 9, which comprises screening the crushed product to about ⅜″.

11. Process according to claim 9, which comprises screening the crushed product so as to obtain a reject which contains between about 88% and 96% SiC.

12. Process according to claim 1, wherein the density of the high density medium is between about 2.2 and about 3.0.

13. Process according to claim 12, wherein the density of the high density medium is between about 2.3 and 2.8.

14. Process according to claim 13, wherein the density of the high density medium is about 2.3.

15. Process according to claim 1, wherein the high density medium comprises water and ferrosilicon, and the density of said high density medium is adjusted to the desired concentration of silicon carbide in the concentrated product.

16. Process according to claim 1, wherein the high density medium comprises water and magnetite, and the density of said high density medium is adjusted to the desired concentration of silicon carbide in the concentrated product.

17. Process according to claim 1, wherein said heavy fraction comprises about 97% SiC and 0.20% free carbon.

18. Process according to claim 1, which comprises separately feeding the heavy fraction and the light fraction to a vibrating drainage screen from which the high density medium comprising a water suspension of ferrosilicon is extracted and recycled to the start of the circuit.

19. Process according to claim 18, wherein after drainage, the heavy fraction and the light fraction are separately washed with water on a humid screen to remove remaining ferrosilicon contained thereon, which, after densifying with a densifier and/or magnetic separators and forming of another pulp, is recycled to the start of the circuit.

20. Process for concentrating silicon carbide from a cylinder of starting material containing silicon carbide obtained by heating a charge comprising silica, recycled material containing silicon carbide and coke, in an electrical oven, comprising the steps of:

crushing said cylinder with a jaw crusher to a granulometry between about ¼–1 inch, said starting material comprising between about 85% and about 95% silicon carbide;

screening the crushed product to a value between 9.5 mm and 0.212 mm so as to give a screened product comprising between about 88% and about 96% silicon carbide;

removing particles of undesired granulometry to obtain a rejected screened product and recycling said particles of undesirable granulometry to ovens;

introducing said rejected screened product into a high density medium comprising water and ferrosilicon to obtain a heavy fraction comprising about 97% silicon carbide and a light fraction comprising about 92% silicon carbide, wherein the density of said high density medium is adjusted to the desired concentration of silicon carbide in the concentrated product;

separately feeding said heavy fraction and said light fraction to respective vibrating drainage screens, whereby said high density medium is separated from said heavy and said light fractions;

recycling said high density medium to said introducing step; and separately washing said separated heavy and light fractions with water on a humid screen to remove ferrosilicon contained thereon, collecting said wash water containing ferrosilicon, densifying said wash water with a densifier or magnetic separator and recycling said densified wash water to said introducing step; and recycling said light fraction to a silicon carbide producing oven.

* * * * *